(12) United States Patent
Hidaka (10) Patent No.: US 9,246,331 B2
(45) Date of Patent: Jan. 26, 2016

(54) POWER SUPPLY CONTROL SYSTEM AND SEMICONDUCTOR INTEGRATED CIRCUIT

(75) Inventor: Yuto Hidaka, Miyazaki (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 713 days.

(21) Appl. No.: 13/562,361

(22) Filed: Jul. 31, 2012

(65) Prior Publication Data
US 2013/0033108 A1 Feb. 7, 2013

(30) Foreign Application Priority Data

Aug. 3, 2011 (JP) .................................. 2011-170359

(51) Int. Cl.
*H02J 7/35* (2006.01)
*H02J 1/10* (2006.01)
(52) U.S. Cl.
CPC .............. *H02J 1/108* (2013.01); *Y10T 307/544* (2015.04)
(58) Field of Classification Search
CPC .............. H02J 3/46; H02J 3/06; H02J 3/382; H02J 1/10; Y02E 10/563; G05F 1/147
USPC ...................................................... 307/51, 52
See application file for complete search history.

(56) References Cited

U.S. PATENT DOCUMENTS

| | | | | |
|---|---|---|---|---|
| 4,812,672 A * | 3/1989 | Cowan et al. | ............ | 307/64 |
| 5,341,082 A * | 8/1994 | Lorenzen et al. | ............ | 320/165 |
| 8,183,715 B2 | 5/2012 | Hanawa et al. | | |
| 2001/0011881 A1 * | 8/2001 | Emori et al. | ............ | 320/116 |
| 2002/0044465 A1 | 4/2002 | Tsai | | |
| 2008/0203820 A1 * | 8/2008 | Kramer et al. | ............ | 307/64 |
| 2010/0201305 A1 * | 8/2010 | Petroianu et al. | ............ | 320/102 |
| 2010/0231175 A1 * | 9/2010 | Noda | ............ | 320/162 |
| 2011/0293970 A1 * | 12/2011 | Shimura et al. | ............ | 429/7 |

FOREIGN PATENT DOCUMENTS

| JP | H06-6934 A | 1/1994 |
|---|---|---|
| JP | H09-191241 A | 7/1997 |
| JP | 09-261861 | 10/1997 |
| JP | 2010207008 A | 9/2010 |
| JP | 2011-061468 | 3/2011 |

OTHER PUBLICATIONS

Japanese Office Action dated Feb. 24, 2015.

* cited by examiner

*Primary Examiner* — Thienvu Tran
*Assistant Examiner* — Brian K Baxter
(74) *Attorney, Agent, or Firm* — Volentine & Whitt, PLLC (57) ABSTRACT

A power supply control system and a semiconductor integrated circuit that may prevent reverse current flow from a solar battery to a primary battery includes first and second switching circuits. In the first switching circuit, a first voltage that is the primary battery output voltage dropped by a first voltage level and a second voltage that is the load side voltage dropped by a second voltage level are compared by a comparator. Electrical connection between the primary battery and the load is disconnected when the second voltage is equal to or greater than the first voltage. In the second switching circuit for a solar battery and the load, the switching circuit is similarly switched OFF before the load side voltage exceeds the output voltage of the primary battery or the solar battery, preventing damage to the battery due to reverse flow of current.

8 Claims, 5 Drawing Sheets

POWER SUPPLY CONTROL SYSTEM AND SEMICONDUCTOR INTEGRATED CIRCUIT

CROSS-REFERENCE TO RELATED APPLICATION

This application claims priority under 35 USC 119 from Japanese Patent Application No. 2011-170359, filed on Aug. 3, 2011, the disclosure of which is incorporated by reference herein.

BACKGROUND OF THE INVENTION

1. Field of the Invention

The present invention relates to a power supply control system and to a semiconductor integrated circuit. For example, the present invention relates to a power supply control system and a semiconductor integrated circuit configured to enable power supply from a primary battery and a solar battery.

2. Description of the Related Art

Rapid development is recently occurring in technology for efficiently employing electricity obtained by converting natural energy into electrical energy employed as a drive source in electrical devices, in order to prevent deterioration of the planet's environment due to phenomena such as global warming. For example, use of solar batteries that converts sunlight directly into electrical energy is attracting attention. In some cases, solar batteries are connected to electrical devices and used on their own, and in some cases they are employed in combination with an existing battery (for example, a lithium primary battery).

A remote controller is disclosed in Japanese Patent Application Laid-Open (JP-A) No. 2011-61468. This remote controller employs a diode OR circuit to switch between a power supply circuit with a solar battery as the supply source, and a power supply circuit with another battery (a lithium primary battery) as the supply source, supplying power to a load by a combination of the solar battery and the other battery. A solar power generating system connected to a solar battery and another battery (a rechargeable battery) is disclosed In JP-A No. 9-261861. The solar power generating system reduces power loss due to voltage drop by making a forward direction current, flowing from the power source side towards the load, flow through a switching section with a smaller power loss than a reverse current prevention diode, when the voltage difference between the two ends of the reverse current prevention diode exceeds a specified value.

In the circuit illustrated in FIG. 9 of JP-A 2011-61468, a diode OR circuit configured by a pair of diodes is provided to prevent current from flowing into the solar battery and the lithium primary battery, respectively. In this circuit, when power is supplied from the solar battery or the lithium primary battery to the load which is a microcomputer, the power passes through one or the other of the diodes in the diode OR circuit. However, a voltage drop of at least the order of 0.7 V is incurred due to the electrical resistance of ordinary diodes, and a loss in the power supply to the load occurs. Such power loss is particularly evident in low power systems driven by a low voltage power sources.

The JP-A No. 9-261861 discloses a reverse current prevention device that prevents a reverse current from flowing from the rechargeable battery to the solar battery. Therefore, in a case in which a primary battery is connected to the reverse current prevention device disclosed in JP-A No. 9-261861, damage to the primary battery from a reverse current flowing into the primary battery may not be prevented.

SUMMARY OF THE INVENTION

The present invention provides a power supply control system and a semiconductor integrated circuit that may reduce loss in the power supply to a load, and may prevent reverse flow of current from a connected solar battery to a primary battery.

A first aspect of the present invention is a power supply control system including: a first switching section including one end connected to a battery and the other end connected to a load; and a second switching section including one end connected to a solar battery and the other end connected to the load, wherein the first switching section compares a first voltage that is the battery output voltage dropped by a first voltage level, and a second voltage that is a voltage at the connection point to the load dropped by a second voltage level, disconnects the battery and the load when the second voltage is equal to or greater than the first voltage, and connects the battery and the load when the second voltage is smaller than the first voltage, and wherein the second switching section compares a third voltage that is the solar battery output voltage dropped by a third voltage level, which is lower than the first voltage level, and the second voltage, disconnects the solar battery and the load when the second voltage is equal to or greater the third voltage, and connects the solar battery and the load when the second voltage is smaller than the third voltage.

A second aspect of the present invention is a semiconductor integrated circuit including: a first terminal for connection to a battery; a second terminal for connection to a solar battery; a third terminal that becomes a connection point of a load and the battery and a connection portion of the load and the solar battery; a first switching circuit including one end connected to the first terminal and another end connected to the third terminal, wherein the first switching circuit compares a first voltage that is a voltage of the first terminal, which is the battery output voltage, dropped by a first voltage level, and a second voltage that is a voltage of the third terminal voltage dropped by a second voltage level, disconnects the battery and the load when the second voltage is equal to or greater than the first voltage, and connects the battery and the load when the second voltage is smaller than the first voltage; and a second switching circuit including one end connected to the second terminal and another end connected to the third terminal, wherein the second switching circuit compares a third voltage that is voltage of the second terminal, which is the solar battery output voltage, dropped by a third voltage level, which is lower than the first voltage level, and the second voltage, disconnects the solar battery and the load when the second voltage is equal to or greater than the third voltage, and connects the solar battery and the load when the second voltage is smaller than the third voltage.

According to the above aspects, the present invention may reduce the loss in the power supply and may prevent reverse flow of current from a solar battery to a primary battery.

BRIEF DESCRIPTION OF THE DRAWINGS

Exemplary embodiments of the present invention will be described in detail based on the following figures, wherein.

DETAILED DESCRIPTION OF THE INVENTION

Figure 1:
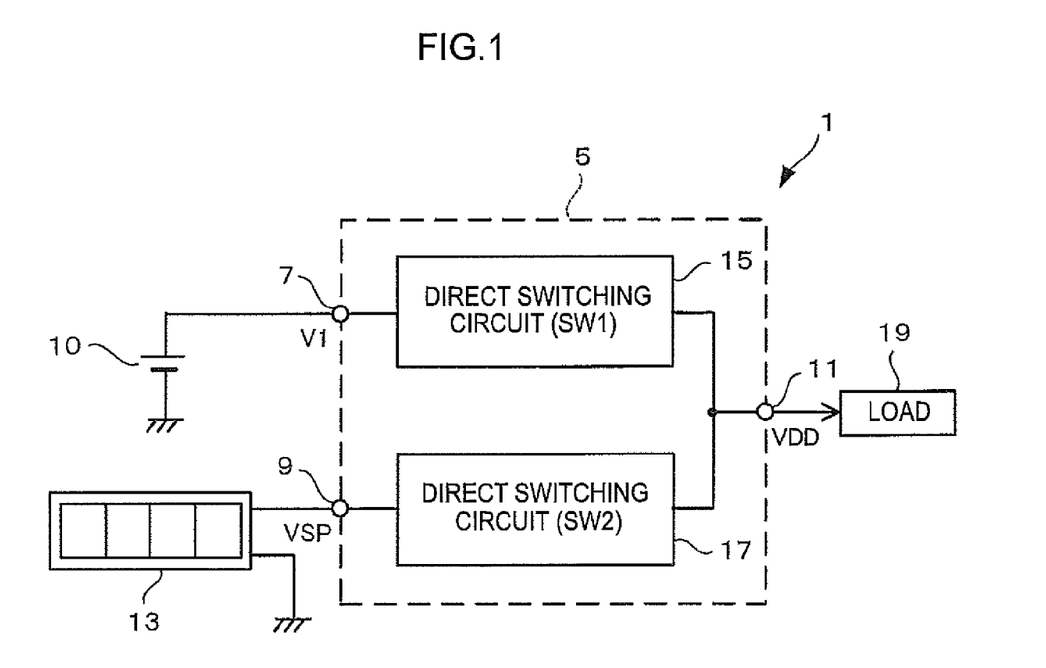
FIG. 1 is a block diagram illustrating a configuration of a power supply control system according to an exemplary embodiment of the present invention.

Explanation follows regarding exemplary embodiments of the present invention, with reference to the drawings. FIG. 1 is a block diagram illustrating a configuration of a power supply control system according to an exemplary embodiment of the present invention. A power supply control system 1 illustrated in FIG. 1 includes a switching section 5, a primary battery 10 and a solar battery 13. The switching section 5 includes two switching circuits, namely a first direct switching circuit (referred to below simply as first switching circuit, or SW1) 15 and a second direct switching circuit (referred to below as second switching circuit or SW2) 17. The primary battery 10 is connected to a terminal 7 provided to the switching section 5 and is, for example, configured by a lithium battery. The solar battery 13 is connected to a terminal 9 of the switching section 5. A load 19 is connected to a terminal 11 of the switching section 5. The load 19 is a small electronic device (for example a calculator or a clock) that is fed power and operates with small power consumption. Power from the primary battery 10 and the solar battery 13 is fed as required through the switching section 5 to the load 19.

In the power supply control system 1 as illustrated in FIG. 1, the switching section 5 has respective circuit configurations, for the first switching circuit 15 and the second switching circuit 17. The switching section 5 is a semiconductor integrated circuit (semiconductor chip) provided with the externally connectable terminals 7, 9, 11 that are connectable to devices, such as batteries.

The first switching circuit 15 is disposed on the path connecting the terminal 7 to which the primary battery 10 is connected, and the terminal 11 to which the load 19 is connected. The first switching circuit 15 controls the current supply from the primary battery 10 to the load 19 so as to be ON/OFF. The second switching circuit 17 is disposed on the path connecting the terminal 9 to which the solar battery 13 is connected, and the terminal 11 to which the load 19 is connected. The second switching circuit 17 controls the current supply from the solar battery 13 to the load 19 so as to be ON/OFF. The solar battery 13 is a solar panel, receiving illumination of light such as sunlight, and outputting power at a specific voltage according to the intensity of illuminated light.

Figure 2:
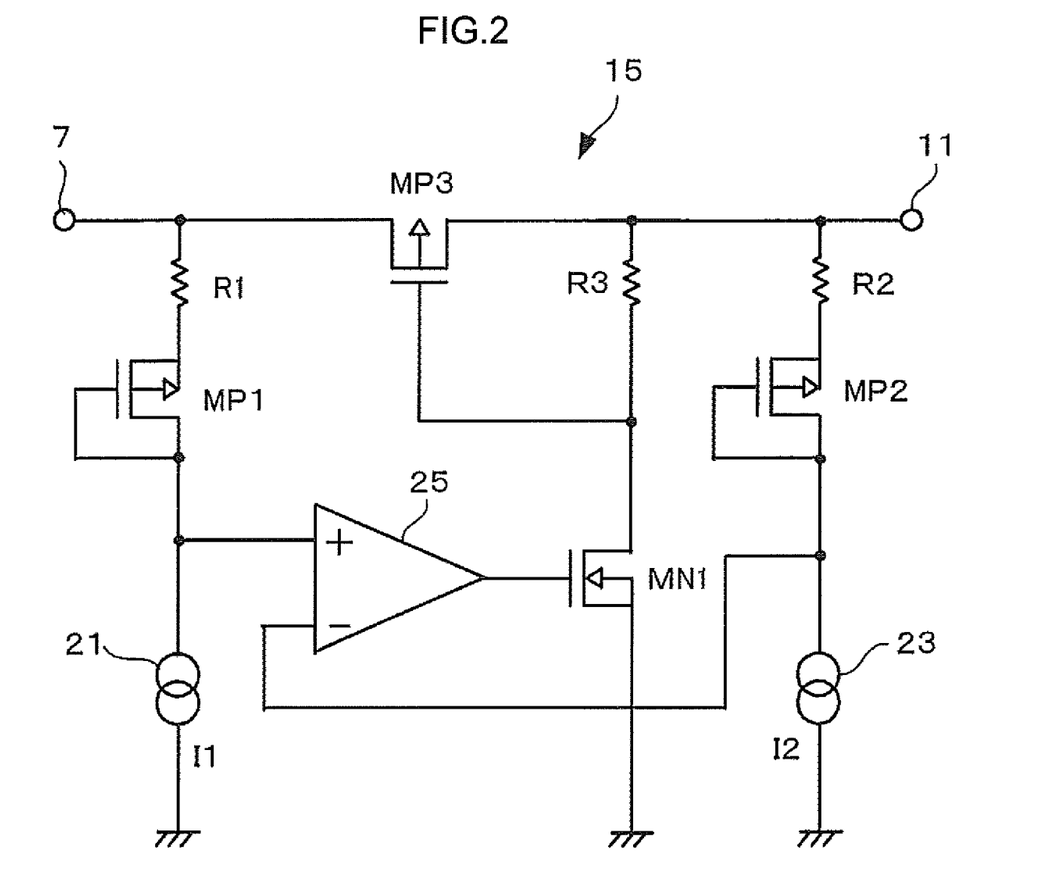
FIG. 2 is a circuit diagram illustrating details of a configuration of a first switching circuit.
Figure 3:
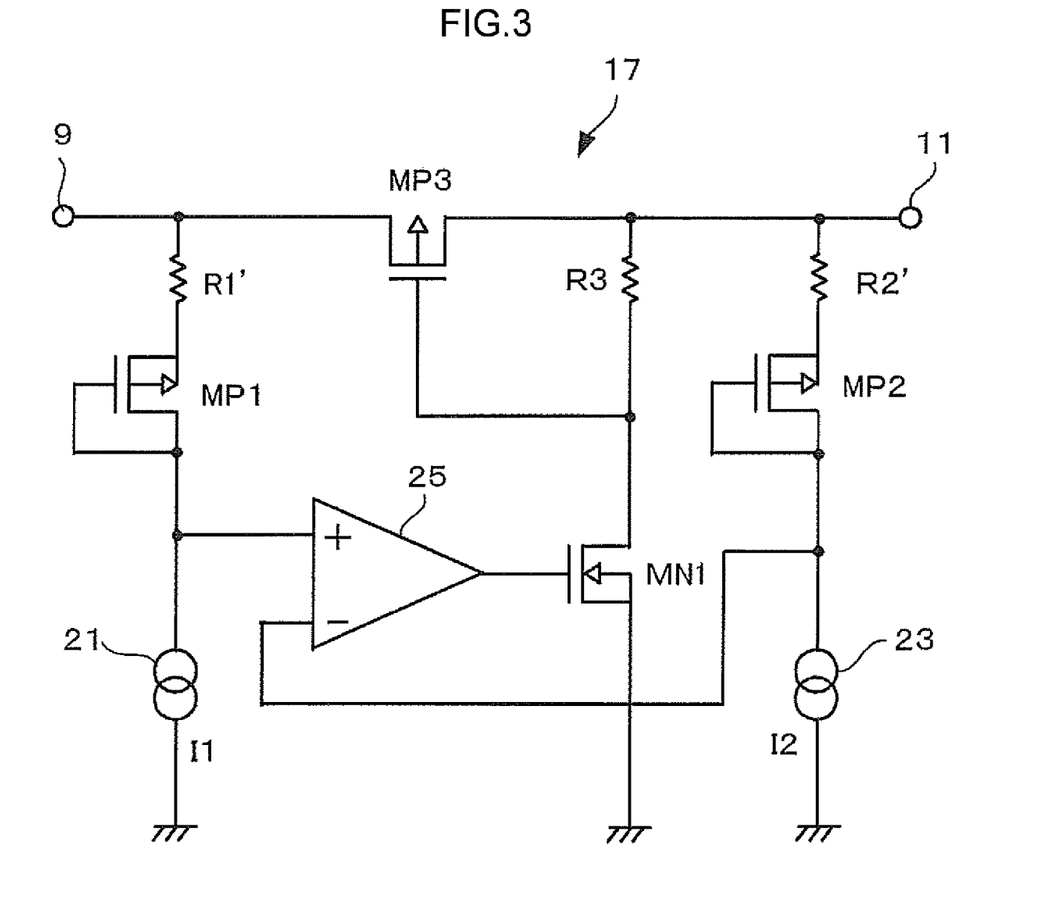
FIG. 3 is a circuit diagram illustrating details of a configuration of a second switching circuit.

FIG. 2 is a circuit diagram illustrating details of the configuration of the first switching circuit 15 of FIG. 1. FIG. 3 is a circuit diagram illustrating details of the configuration of the second switching circuit 17. Note that, similar configuration elements in FIG. 2 and FIG. 3 are allocated the same reference numerals. As explained above, in the first switching circuit 15, the primary battery 10 is connected to the terminal 7 and the load 19 is connected to the terminal 11. In the second switching circuit 17, the solar battery 13 is connected to the terminal 9 and the load 19 is connected to the terminal 11. As illustrated in FIG. 2, a voltage detection circuit is disposed between the terminal 7 of the first switching circuit 15 and a ground terminal (GND terminal). The voltage detection circuit is configured by a resistor R1, a P-channel MOS transistor MP1 in which the gate electrode and drain electrode are shorted (diode connected), and a current supply source 21, connected in series. Further, between the terminal 11 and a ground terminal (GND terminal) another voltage detection circuit is also disposed. This voltage detection circuit is configured by a resistor R2, a P-channel MOS transistor MP2 in which the gate electrode and drain electrode are shorted (diode connected), and a current supply source 23, connected in series.

As illustrated in FIG. 3, a voltage detection circuit is disposed between the terminal 9 of the second switching circuit 17 and a ground terminal (GND terminal). The voltage detection circuit is configured by a resistor R1', a P-channel MOS transistor MP1 in which the gate electrode and drain electrode are shorted (diode connected), and a current supply source 21, connected in series. Further, between the terminal 11 and the ground terminal (GND terminal), another voltage detection circuit is also disposed. This voltage detection circuit is configured by a resistor R2', a P-channel MOS transistor MP2 in which the gate electrode and drain electrode are shorted (diode connected), and a current supply source 23, connected in series.

The connection points of the P-channel MOS transistor MP1 and the current supply source 21 in the first switching circuit 15 and the second switching circuit 17 are connected to the non-inverting input terminal (+) of respective comparators 25. The connection points of the P-channel MOS transistor MP2 and the current supply source 23 are connected to the inverting input terminals (−) of the respective comparators 25. Further, a P-channel MOS transistor MP3 is disposed between the terminal 7 and the terminal 11 of the first switching circuit 15. Similarly, a P-channel MOS transistor MP3 is disposed between the terminal 9 and the terminal 11 of the second switching circuit 17.

In the first switching circuit 15 and the second switching circuit 17, circuits each configured by a resistor R3 and an N-channel MOS transistor MN1 connected in series are connected between the drain electrode of the transistor MP3 and a ground terminal, respectively. One end of the resistor R3 is connected to the drain electrode of the MP3, and the other end of the resistor R3 is connected to the drain electrode of the N-channel MOS transistor MN1. The source electrode of the transistor MN1 is connected to ground, and the output terminal of the comparator 25 is connected to the gate electrode of the transistor MN1. A connection point between the resistor R3 and the drain electrode of the N-channel MOS transistor MN1 is connected to the gate electrode of the P-channel MOS transistor MP3. Thus, in the first switching circuit 15, the source electrode of the P-channel MOS transistor MP3 is connected to the terminal 7. Further, in the second switching circuit 17, the source electrode of the MP3 is connected to the terminal 9. Furthermore, in both the first switching circuit 15 and the second switching circuit 17, the drain electrode of the MP3 is connected to the terminal 11.

Note that, the output of the comparator 25 may be directly input to the gate electrode of the P-channel MOS transistor MP3. However due to the transistor MP3 being a PMOS transistor, the MP3 would be electrically OFF when the gate electrode of the MP3 is at the logical "H" level. However, when the operation power source of the comparator 25 is supplied by the primary battery 10 or the solar battery 13 and when power supply stops, the gate electrode of the transistor MP3 would be logical "L". Consequently, in a configuration in which the output of the comparator 25 is directly input to the gate electrode of the transistor MP3, the transistor MP3 would not be switched OFF, in the state in which no power is supplied to the comparator 25, and a reverse current may flow through the MP3.

However, in the first switching circuit 15 and the second switching circuit 17 of the power supply control system of the present exemplary embodiment, as illustrated in FIG. 2 and FIG. 3, circuits each configured by the resistor R3 and the N-channel MOS transistor MN1 connected in series are connected between the drain electrode of the MOS transistor MP3 and a ground terminal, respectively. According to the above configuration, in the present exemplary embodiment, when power supply to the comparator 25 stops, and when the gate electrode of the MOS transistor MN1 becomes logical "L", the gate electrode of the transistor MP3 is pulled up to logical "H" level by the resistor R3. Accordingly, in the present exemplary embodiment, the MP3 in the first switching circuit 15 and in the second switching circuit 17 may be switched OFF.

Explanation follows regarding operation of the switching section 5 (the first switching circuit 15 and the second switching circuit 17) in the power supply control system according to the present exemplary embodiment. In the first switching circuit 15 illustrated in FIG. 2, the resistors R1 and R2 have the relationship of R1>R2. The transistors MP1 and MP2 are P-channel MOS transistors of the same size. Consequently, current I1 flowing in the current supply source 21 and current I2 flowing in the current supply source 23 are set to be equivalent. In the first switching circuit 15, when the output voltage of the primary battery 10 connected to the terminal 7 is denoted as V1, and the current flowing from the primary battery 10 to the R1, the MP1 and the current supply source 21 is denoted as I1, the voltage input to the non-inverting input terminal of the comparator 25 becomes the voltage drop across the R1 and the MP1 (the voltage drop across the MP1 is denoted $V_{MP1}$), namely, R1·I1+$V_{MP1}$ subtracted from V1. Further, when the supply voltage to the load 19 (voltage at terminal 11) is denoted as VDD and the current flowing from the terminal 11 to the R2, the MP2 and the current supply source 23 is denoted as I2, the voltage input to the inverting input terminal of the comparator 25 becomes the voltage drop across the R2 and the MP2 (the voltage drop across the MP2 is denoted $V_{MP2}$), namely, R2·I2+$V_{MP2}$ subtracted from VDD.

As stated above, the MP1 and the MP2 are transistors of the same size, and the current I1 and the current I2 are equivalent. The voltage drops across the MP1 and the MP2 are therefore also equivalent ($V_{MP1}$=$V_{MP2}$). However since R1>R2, the input voltage input to the inverting input terminal of the comparator 25 is greater than the input voltage input to the non-inverting input terminal of the comparator 25 by the difference in resistance values between the R1 and the R2. Therefore, the point at which output of the comparator 25 inverts is when V1−R1·I1=VDD−R2·I2. Since I1=I2, I1 and I2 may be denoted as I, the V1−R1·I=VDD−R2·I becomes the output inversion condition of the comparator 25. Therefore when V1−R1·I≥VDD−R2·I, namely when V1≥VDD+(R1−R2)·I, the comparator 25 outputs a voltage of "H" level. On the other hand, when V1−R1·I<VDD−R2·I, namely when V1<VDD+(R1−R2)·I, the comparator 25 outputs a voltage of "L" level.

When the output voltage of the comparator 25 is "H" level, the N-channel MOS transistor MN1 becomes a conducting state (ON). However, since the source electrode of the transistor MN1 is connected to ground, and the gate electrode of the P-channel MOS transistor MP3 becomes "L" level, and the transistor MP3 becomes switched ON. As a result, the terminal 7 and the terminal 11 are connected, and the output voltage V1 of the primary battery 10 is supplied as the VDD to the load 19. On the other hand, when the output voltage of the comparator 25 is "L" level, the N-channel MOS transistor MN1 becomes a non-conducting state (OFF), and the gate voltage of the P-channel MOS transistor MP3 is pulled up by the R3 to the VDD, switching the MP3 OFF.

The second switching circuit 17 illustrated in FIG. 3 operates similarly to the operation of the first switching circuit 15 described above. In the second switching circuit 17, when the output voltage of the solar battery 13 is denoted as VSP, the output inversion condition of the comparator 25 becomes VSP−R1'·I=VDD−R2'. Therefore, the output voltage of the comparator 25 becomes "H" level when VSP−R1'·I≥VDD−R2'·I (namely when VSP≥VDD+(R1'−R2')·I). On the other hand, the output voltage of the comparator 25 becomes "L" level when VSP−R1'·I<VDD−R2'·I (namely when VSP<VDD+(R1'−R2')·I).

Therefore, in the switching section 5 of FIG. 1, the first switching circuit 15 is switched ON when V1 is VDD+(R1−R2)·I or greater, and current is supplied to the load 19 by the primary battery 10. However, the first switching circuit 15 is switched OFF when V1 is less than VDD+(R1−R2)·I. As a result, reverse current may be prevented from flowing into the primary battery 10 from the load 19. Likewise in the second switching circuit 17, the second switching circuit 17 is switched ON when the VSP is VDD+(R1'−R2')·I or greater, and current from the solar battery 13 is supplied to the load 19. However, the second switching circuit 17 is switched OFF when the VSP is less than VDD+(R1'−R2')·I. As a result, reverse current may be prevented flowing to the solar battery 13 from the load 19. Thus, the load 19 is input with an output of the higher voltage from the output voltage V1 of the primary battery 10 dropped by (R1−R2)·I or the output voltage VSP of the solar battery 13 dropped by (R1'−R2')·I.

While not illustrated in FIG. 2 and FIG. 3, the comparator 25 of the first switching circuit 15 is driven by the power supply from the primary battery 10, and the comparator 25 of the second switching circuit 17 is driven by the power supply from the solar battery 13. Accordingly, in a case in which the input signal level input to the comparator 25 is at a level close to the saturation range of the comparator 25, the operation characteristics of voltage comparison may be affected. Therefore, in the switching circuits (the first switching circuit 15 and the second switching circuit 17) of the power supply control system according to the present exemplary embodiment, the voltage of the primary battery 10 is input to the non-inverting input terminal of the comparator 25 after the voltage level has been adjusted by dropping the voltage of the solar battery 13 using the resistor R1'. Furthermore, in the switching circuits of the power supply control system according to the present exemplary embodiment, the supply voltage to the load is also dropped by the resistors R2, R2', and the dropped voltage is then input to the inverting input terminal of the comparator 25. With respect to the resistors R1, R2, R1', R2', for example, resistor having high resistance value of several tens kΩ is employed in order to efficiently supply the output currents from the primary battery 10 and the solar battery 13 to the load 19, without loss.

Note that, there is a possibility that the output voltage VSP of the solar battery 13 falls to 0V, in a case in which the entire solar battery 13 is not able to exhibit its power generating function, due to blocked light, for example. In such case, the comparator 25 of FIG. 3 with the solar battery 13 as a drive power supply no longer operates. However, the output voltage of the comparator 25 also becomes 0V, and the N-channel MOS transistor MN1 becomes OFF. Accordingly, in such case, the gate electrode of the P-channel MOS transistor MP3 is also pulled up to logical "H" level by the resistor R3, the transistor MP3 becomes OFF, and the reverse current may also be prevented from flowing into the solar battery 13 from the load 19.

As described above, in the first switching circuit 15 as illustrated in FIG. 2, reverse current from the load 19 to the primary battery 10 may be prevented by switching the P-channel MOS transistor MP3 OFF, when the output voltage V1 of the primary battery 10 becomes smaller than the voltage of $(R1-R2) \cdot I + VDD$. In the first switching circuit 15, by making R1>R2, the dropped voltage level from the primary battery 10 through the R1 is made to be greater than the dropped voltage level from the power supply voltage VDD from the load side through the R2, so as to consider the operating speed (response speed) of the comparator 25. Accordingly, the first switching circuit 15 may start operation to switch the MP3 from ON to OFF before the voltage to the load 19 and the output voltage of the primary battery 10 becomes equivalent. As a result, the first switching circuit 15 may reliably prevent reverse flow of current to the primary battery 10 from the load 19, and may prevent damage to the primary battery 10.

Similarly, in the second switching circuit 17 of FIG. 3, by making R1'>R2', the dropped voltage level of the solar battery 13 across the R1' is made greater than the dropped voltage level of the power supply voltage VDD to the load across the R2'. Accordingly, the second switching circuit 17 may start operation to switch the MP3 OFF before the voltage on the load 19 and the output voltage of the solar battery 13 becomes equivalent, and may prevent input of current to the solar battery 13 from the load 19 side.

Figure 4:
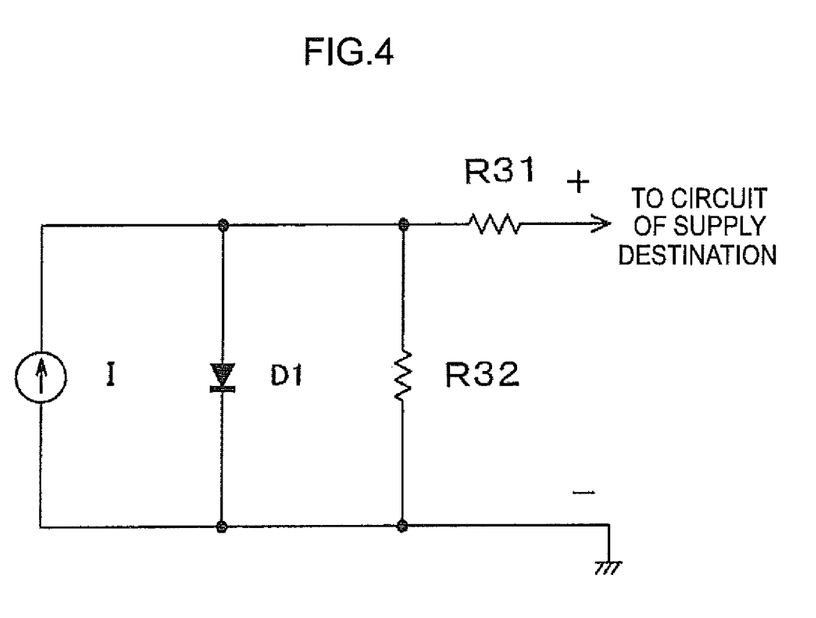
FIG. 4 is a diagram illustrating an equivalent circuit diagram of a solar battery.

The first switching circuit 15 and the second switching circuit 17 of the power supply control system according to the present exemplary embodiment operate in substantially the same way, however, differ in the operation timing for switching the MP3 from ON to OFF. Explanation follows regarding the above point of difference. The solar battery 13 may, for example, be represented, as an equivalent circuit with a resistor R32 and a diode D1 connected in parallel, and a resistor R31 connected in series thereto, as illustrated in FIG. 4. Accordingly, even when reverse current flow from the load to the solar battery 13, there is a lower risk of damage occurring in the solar battery. Accordingly, battery damage may not occur even when the timing to switch the MP3 of the second switching circuit 17 OFF is delayed from timing of switching the MP3 of the first switching circuit 15 from ON to OFF.

Accordingly, in the power supply control system of to the present exemplary embodiment, the difference in the dropped voltage levels due to the resistors R1', R2' in the second switching circuit 17, is set to be smaller than the difference in dropped voltage levels due to the resistors R1, R2 in the first switching circuit 15. Due to the above configuration, when the difference $(R1-R2) \cdot I$ between the output voltage V1 of the primary battery 10 and the load 19 power supply voltage VDD is denoted as drop voltage Vd1, and the difference $(R1'-R2') \cdot I$ between the output voltage VSP of the solar battery 13 and the load 19 power supply voltage VDD is denoted as drop voltage Vd2, then Vd1 is greater than Vd2. Hence, when the first switching circuit 15 and the second switching circuit 17 are both ON, becomes V1−Vd1=VSP−Vd2, which may be rewritten as V1=VSP+(Vd1−Vd2). Since Vd1>Vd2, becomes Vd1−Vd2>0, and therefore V1>VSP when the first switching circuit 15 and the second switching circuit 17 are both ON.

Accordingly, by making the drop voltage Vd1 (the first switching circuit 15) greater than the drop voltage Vd2 (the second switching circuit 17), current does not flow from the solar battery 13 to the primary battery 10, even when the first switching circuit 15 and the second switching circuit 17 are both ON. Hence, according to the above configuration, damage to the primary battery 10 may be prevented. Further, by making Vd1 greater than Vd2, the operation timing to switch OFF the MP3 in the second switching circuit 17 is delayed, relative to the operation to switch OFF the MP3 in the first switching circuit 15. Accordingly, power supply to the load 19 from the solar battery 13 may be continued for a long duration. As a result, the present exemplary embodiment may secure sufficient current supply from the solar battery 13 to the load 19, and may prevent damage to the primary battery.

As explained above, according to the present exemplary embodiment, the switching circuits, that prevents reverse flow of current from the load to the primary battery and from the load to the solar battery, are provided between the primary battery and a load that receives power supply from the primary battery, and between a solar battery and a load that receives power supply from the solar battery. Accordingly, the present exemplary embodiment may greatly reduce the voltage loss during power supply to the load, when compared to a conventional reverse flow prevention circuit employing a diode.

In the present exemplary embodiment, in the first switching circuit provided between the primary battery and the load, a comparison is made between a first voltage of the output voltage of the primary battery dropped by a first voltage level and a second voltage of the load side voltage dropped by a second voltage level. Further, in the present exemplary embodiment, configuration is made such that electrical connection between the primary battery and the load is disconnected, when the second voltage is higher than the first voltage. Accordingly, the present exemplary embodiment may switch OFF the first switching circuit before the voltage to the load exceeds the output voltage of the primary battery, and therefore may prevent malfunction and damage of the primary battery due to reverse current flow.

Furthermore, in the present exemplary embodiment, in the second switching circuit provided between the solar battery and the load, and a comparison is made of a third voltage that is lower than the first voltage level and is the solar battery output voltage dropped by a third voltage level and the second voltage of the load side voltage dropped by the second voltage level. Further, in the present exemplary embodiment, configuration is made such that the electrical connection of the solar battery and the load is disconnected, when the second voltage is higher than the third voltage. Accordingly, the present exemplary embodiment may delay the timing at which the second switching circuit is switched OFF by the second voltage rising until after the first switching circuit is switched OFF, and may supply power from the solar battery to the load for a longer duration.

Figure 5A:
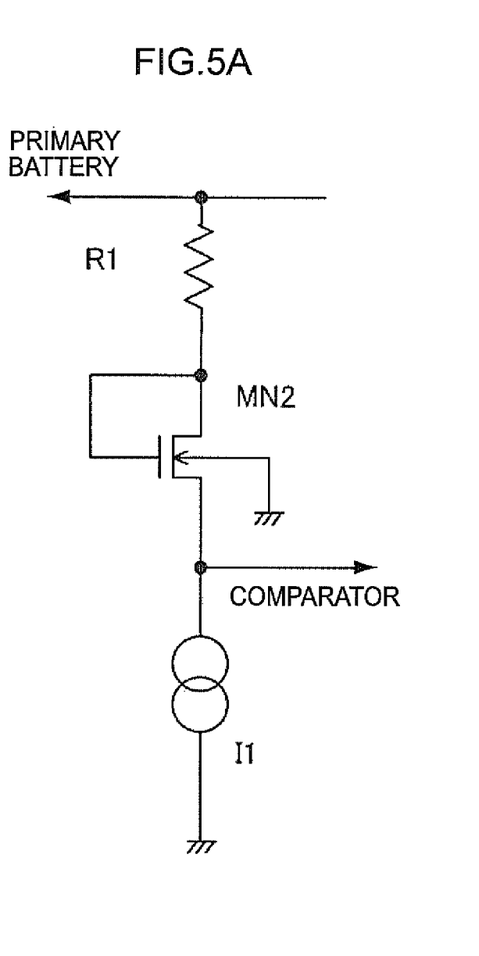
FIG. 5A to FIG. 5C are diagrams illustrating modification examples of a first switching circuit and second switching circuit in a power supply control system according to an exemplary embodiment.

Note that the power supply control system according to the present invention is not limited to the above exemplary embodiment and various modifications may be possible. For example, in the voltage detection circuit connected between the terminal 7 of the first switching circuit 15 and a ground terminal, and the voltage detection circuit connected between the terminal 9 of the second switching circuit 17 and a ground terminal, the P-channel MOS transistor MP1 (that has its gate electrode and drain electrode shorted, namely, diode connected) may be substituted by an N-channel MOS transistor MN2 which is diode connected and its base terminal grounded, as illustrated in FIG. 5A. Accordingly, it is possible to substitute N-channel MOS transistors for the P-channel MOS transistors configuring the voltage detection circuits. A similar modification is also possible to the voltage detection circuit connected between the terminal 11 and the ground terminal in the first switching circuit 15 and the second switching circuit 17.

Figure 5B:
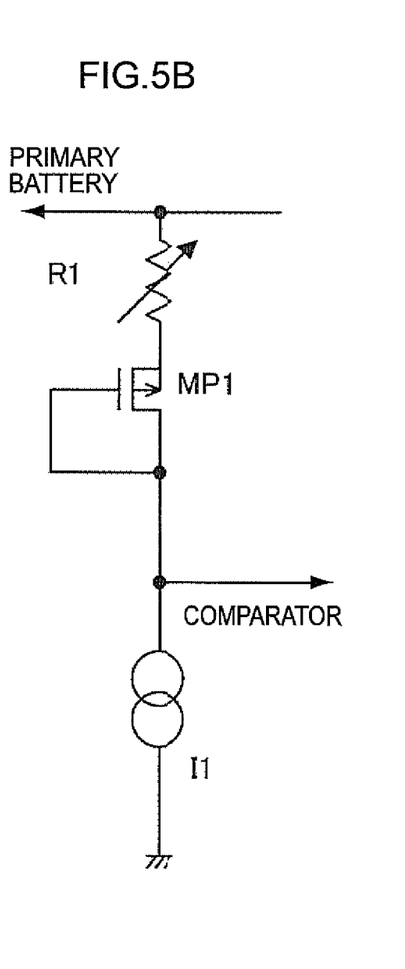
Figure 5C:
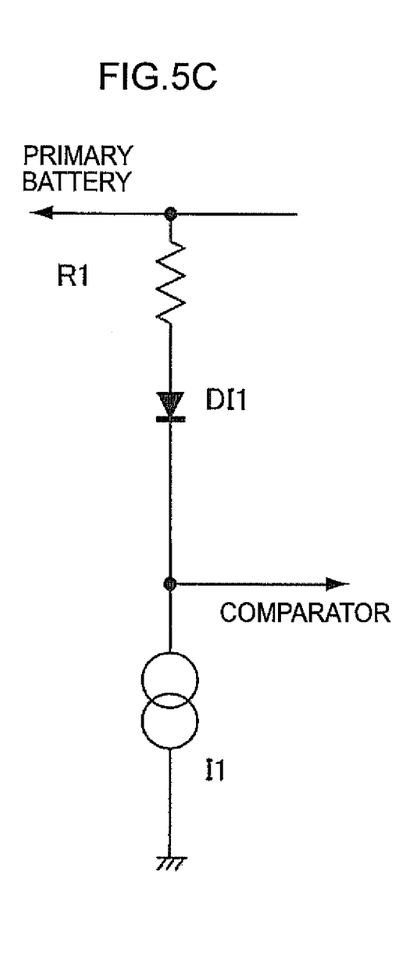

Further, the resistor R1 configuring the voltage detection circuit of the first switching circuit 15, and the resistor R1' configuring the voltage detection circuit of the second switching circuit 17 may be variable resistors, as illustrated in FIG. 5B. In such case, the detection voltage may be adjusted to match the saturation region level of the comparator 25. Furthermore, the respective P-channel MOS transistors MP1 configuring the voltage detection circuit of the first switching circuit 15 and the voltage detection circuit of the second switching circuit 17 may be substitute by a diode DI1, as illustrated in FIG. 5C. A similar modification may also be made to the voltage detection circuit connected between the terminal 11 and the ground terminal of the first switching circuit 15 and second switching circuit 17.

As another modification example, configuration may be made with the transistor MP1 removed in the voltage detection circuit of the first switching circuit 15 and in the voltage detection circuit of the second switching circuit 17. In this configuration, the voltage drop of the threshold value voltage Vt of the P-channel MOS transistor does not occur in the voltage detection circuits, and therefore the MP3 may be switched ON at a lower voltage, when compared to a case which the transistor MP1 is provided. Accordingly, in this modification example, the minimum operation voltage may be lowered. However, in this modification example, the maximum voltage of the input voltage range of the comparator 25 needs to be raised by the amount of the voltage drop of the transistor MP1. A similar modification may also be possible for the transistors MP2 in the first switching circuit 15 and the second switching circuit 17.

As another configuration for reducing the minimum operating voltage, for example, the resistor R1 may be removed from the voltage detection circuit to eliminate the voltage drop due to the resistor R1, thereby enabling the transistor MP3 to be switched ON at a lower voltage. In the above configuration, reduction in size and larger voltage drop may be achieved for the same current of the amount of the voltage removed, and may enable the layout size to be reduced. However, in this modification example, since the voltage drop due to the resistor R1 has been eliminated, the maximum voltage taken by the input voltage range of the comparator 25 needs to be raised by this amount. Similar modifications may be possible for the resistor R2 of the first switching circuit 15, and the resistors R1', R2' of the second switching circuit 17.

Further, configuration may also be made such that the transistor MP1 is removed from the voltage detection circuits, and the power supply voltage VDD to the load is directly input to the comparator 25. Namely, the resistance value of the resistor R1 multiplied by the current value of the current supply source 21 gives the potential difference between the primary battery and the VDD (for the first switching circuit) and the potential difference between the solar battery and the VDD (for the second switching circuit). Therefore, the size may be decreased in a configuration in which the transistor MP1 and/or elements) on the VDD side (the resistor R2, the transistor MP2 and/or the current supply source 23) are removed or excluded, and the current consumption may be reduced since there is only a single current source. A similar configuration may be made for the transistors MP2 of the voltage detection circuits.

In the first switching circuit 15 according to the exemplary embodiment explained above (and similarly in the second switching circuit 17), the same size P-channel MOS transistors have been set for the transistors MP1 and MP2, such that the current I1 flowing in the current supply source 21 and the current I2 flowing in the current supply source 23 are equivalent. In the first switching circuit 15 (and similarly in the second switching circuit 17) according to the exemplary embodiment explained above, the resistor R1 has been set greater than the resistor R2 to achieve a difference between the dropped voltage level of the primary battery 10 and the dropped voltage level of the supply voltage to the load. However, a configuration that realizes a difference in dropped voltage level is not limited thereto. For example, it is possible to provide a difference in voltage drop by making the resistors R1 and R2 equivalent and making a difference between the currents I1 and I2. More specifically, by making the current value of the primary battery 10 twice the current value on the load side, the voltage drop on the primary battery may be made twice that on the load with the resistors R1 and R2 equivalent. In such case, since a difference in voltage drops between the transistors MP1 and MP2 occur, the current capability of the transistor MP1 needs to be made twice the current capability of the MP2.

The above exemplary embodiments, a case in which the present invention is applied for controlling the power supply of a primary battery and a solar battery, has been described. However, the source of power supplies to be controlled is not limited thereto. The present invention may be applied, for example, to a rechargeable battery such as a nickel cadmium battery, a nickel hydrogen battery or a lithium ion battery, or a regulator output as typified by a 3 terminal regulator. Furthermore, in the above exemplary embodiment, a case in which the number of power supply sources to be controlled in the power supply control system is two sources, the primary battery and the solar battery, has been described. However, the present invention may be applied to 3 or more power sources by further adding the direct switching circuit(s).

What is claimed is:

1. A power supply control system comprising:
a first switching section including one end connected to a battery and another end connected to a load; and
a second switching section including one end connected to a solar battery and another end connected to the load,
wherein the first switching section is configured to compare a first voltage that is a battery output voltage dropped by a first voltage level, and a second voltage that is a voltage at a connection point to the load dropped by a second voltage level, disconnect the battery and the load when the second voltage is equal to or greater than the first voltage, and connect the battery and the load when the second voltage is smaller than the first voltage, and
wherein the second switching section is configured to compare a third voltage that is a solar battery output voltage dropped by a third voltage level, which is lower than the first voltage level, and the second voltage, disconnect the solar battery and the load when the second voltage is equal to or greater the third voltage, and connect the solar battery and the load when the second voltage is smaller than the third voltage.

2. The power supply control system of claim 1, wherein, the first switching section comprises:
a first circuit in which a first resistor, a first transistor which is diode connected, and a first current source are connected in series between a connection point to the battery and a ground terminal, wherein a voltage at a connection point of the first current source and the first transistor is the first voltage;
a second circuit in which a second resistor, a second transistor which is diode connected, and a second current source are connected in series between a connection point to the load and the ground terminal, wherein a voltage at a connection point of the second current source and the second transistor is the second voltage;

a first voltage comparator section configured to compare the first voltage and the second voltage; and a third transistor that configured to connect or disconnect the battery and the load, according to a comparison result output by the first voltage comparator section, and the second switching section comprises:

a third circuit in which a third resistor, a fourth transistor which is diode connected, and a third current source are connected in series between a connection point to the solar battery and the ground terminal, wherein a voltage at a connection point of the third current source and the fourth transistor is the third voltage;

a fourth circuit in which a fourth resistor, a fifth transistor which is diode connected, and a fourth current source are connected in series between a connection point to the load and the ground terminal, wherein a voltage at a connection point of the fourth current source and the fifth transistor is the second voltage;

a second voltage comparator section configured to compare the third voltage and the second voltage; and a sixth transistor configured to connect or disconnect the solar battery and the load, according to a comparison result output by the second voltage comparator section, and wherein the first voltage level is determined by a resistance value of the first resistor, the second voltage level is determined by a resistance value of the second resistor or the fourth resistor, the third voltage level is determined by a resistance value of the third resistor, the resistance value of the first resistor is higher than the resistance value of the second resistor, and the resistance value of the third resistor is higher than the resistance value of the fourth resistor.

3. The power supply control system of claim 2, wherein a potential difference between the solar battery output voltage and a voltage at the connection point to the load, determined by the third resistor and the fourth resistor of the second switching section, is set to be smaller than a potential difference between the battery output voltage and the voltage at the connection point to the load, determined by the first resistor and the second resistor of the first switching section.

4. A semiconductor integrated circuit comprising:
a first terminal configured to be connected to a battery;
a second terminal configured to be connected to a solar battery;
a third terminal configured to be connected to a connection point of a load and the battery, and a connection portion of the load and the solar battery;
a first switching circuit including one end connected to the first terminal and another end connected to the third terminal, wherein the first switching circuit is configured to compare a first voltage that is a voltage at the first terminal, which is a battery output voltage, dropped by a first voltage level, and a second voltage that is a voltage at the third terminal voltage dropped by a second voltage level, disconnect the battery and the load when the second voltage is equal to or greater than the first voltage, and connect the battery and the load when the second voltage is smaller than the first voltage; and
a second switching circuit including one end connected to the second terminal and another end connected to the third terminal, wherein the second switching circuit is configured to compare a third voltage that is a voltage at the second terminal, which is a solar battery output voltage, dropped by a third voltage level, which is lower than the first voltage level, and the second voltage, disconnect the solar battery and the load when the second voltage is equal to or greater than the third voltage, and connect the solar battery and the load when the second voltage is smaller than the third voltage.

5. The semiconductor integrated circuit of claim 4, wherein,
the first switching circuit comprises:
a first circuit in which a first resistor, a first transistor which is diode connected, and a first current source are connected in series between the first terminal and a ground terminal, wherein a voltage at a connection point of the first current source and the first transistor is the first voltage;
a second circuit in which a second resistor, a second transistor which is diode connected, and a second current source are connected in series between the third terminal and the ground terminal, wherein a voltage at a connection point of the second current source and the second transistor is the second voltage;
a first voltage comparator section configured to compare the first voltage and the second voltage; and
a third transistor configured to connect or disconnect the battery and the load, according to a comparison result output by the first voltage comparator section,
the second switching circuit comprises:
a third circuit in which a third resistor, a fourth transistor which is diode connected, and a third current source are connected in series between the second terminal and the ground terminal, wherein a voltage at a connection point of the third current source and the fourth transistor is the third voltage;
a fourth circuit in which a fourth resistor, a fifth transistor which is diode connected, and a fourth current source are connected in series between the third terminal and the ground terminal, wherein a voltage at a connection point of the fourth current source and the fifth transistor is the second voltage;
a second voltage comparator section configured to compare the third voltage and the second voltage; and
a sixth transistor configured to connect or disconnect the solar battery and the load, according to a comparison result output by the second voltage comparator section, and
wherein the first voltage level is determined by a resistance value of the first resistor, the second voltage level is determined by a resistance value of the second resistor or the fourth resistor, the third voltage level is determined by a resistance value of the third resistor, the resistance value of the first resistor is higher than the resistance value of the second resistor, and the resistance value of the third resistor is higher than the resistance value of the fourth resistor.

6. The semiconductor integrated circuit of claim 5, wherein a potential difference between the voltage at the second terminal and the voltage at the third terminal, determined by the third resistor and the fourth resistor of the second switching circuit, is set to be smaller than a potential difference between the voltage at the first terminal and the voltage at the third terminal, determined by the first resistor and the second resistor of the first switching circuit.

7. The power supply control system of claim 1, wherein the first switching section comprises a first voltage comparator section configured to compare the first voltage and the second voltage, and that is driven by power supplied from the battery; and wherein the second switching section comprises a second voltage comparator section configured to compare the third voltage and the second voltage, and that is driven by power supplied from the solar battery.

8. The semiconductor integrated circuit of claim 4, wherein the first switching circuit comprises a first voltage comparator section configured to compare the first voltage and the second voltage, and that is driven by power supplied from the battery; and wherein the second switching circuit comprises a second voltage comparator section configured to compare the third voltage and the second voltage, and that is driven by power supplied from the solar battery.

* * * * *